Figure 1:
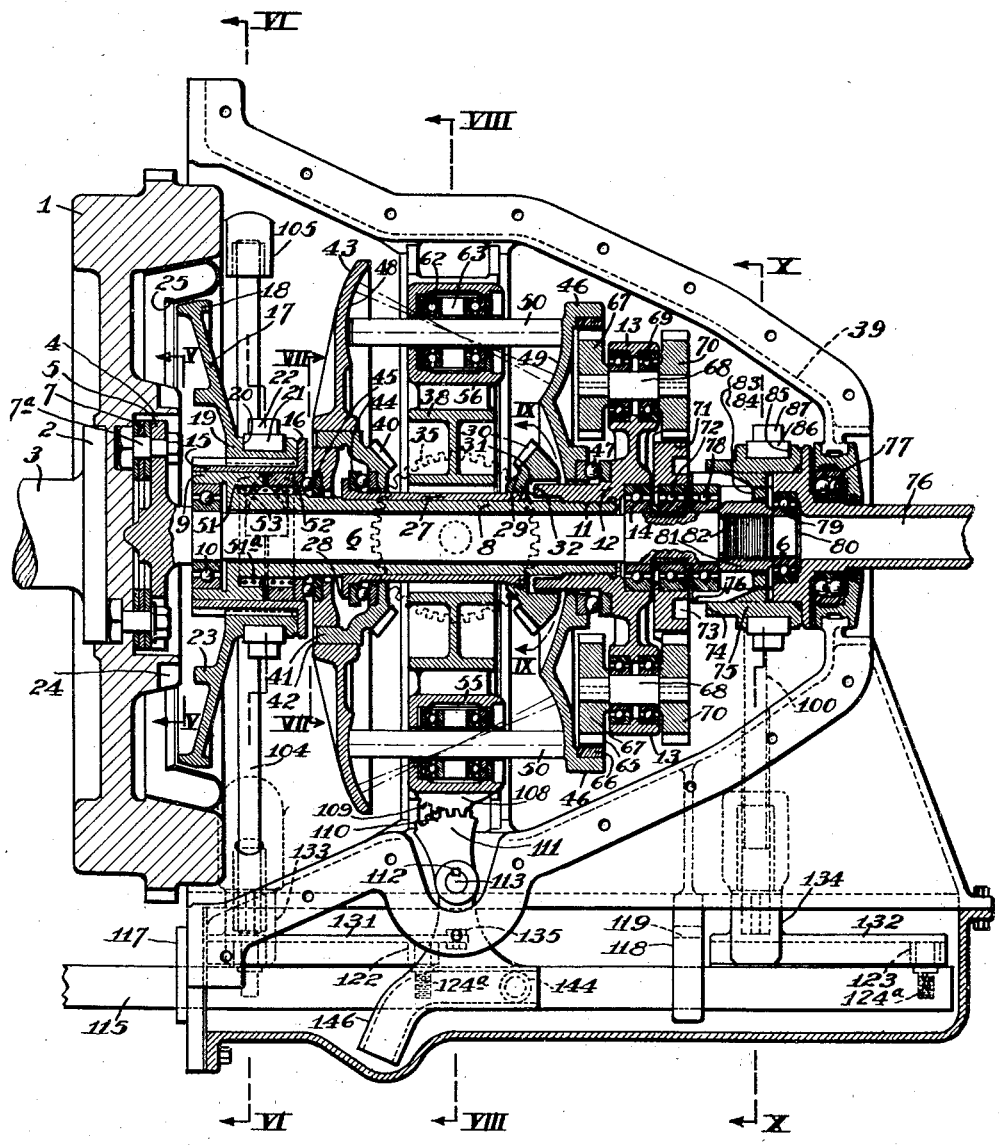

Aug. 4, 1931.  G. S. MORISON  1,817,159
TRANSMISSION MECHANISM
Filed Sept. 24, 1927   8 Sheets-Sheet 1

WITNESSES
A. B. Wallace.
Jo. Baith Brown

INVENTOR
George Smith Morison
by Brown & Critchlow
his attorneys

Aug. 4, 1931.    G. S. MORISON    1,817,159
TRANSMISSION MECHANISM
Filed Sept. 24, 1927    8 Sheets-Sheet 2

Aug. 4, 1931.   G. S. MORISON   1,817,159
TRANSMISSION MECHANISM
Filed Sept. 24, 1927   8 Sheets-Sheet 4

WITNESSES

INVENTOR
George Smith Morison
by Brown & Critchlow
his Attorneys

Aug. 4, 1931.  G. S. MORISON  1,817,159
TRANSMISSION MECHANISM
Filed Sept. 24, 1927   8 Sheets-Sheet 5

WITNESSES
A B Wallace
Jo Baily Brown

INVENTOR
George Smith Morison
by Brown & Critchlow
his attorneys

Aug. 4, 1931.  G. S. MORISON  1,817,159
TRANSMISSION MECHANISM
Filed Sept. 24, 1927  8 Sheets-Sheet 6

INVENTOR
George Smith Morison
by Brown & Critchlow
his Attorneys

Aug. 4, 1931.  G. S. MORISON  1,817,159
TRANSMISSION MECHANISM
Filed Sept. 24, 1927   8 Sheets-Sheet 7

WITNESSES

INVENTOR
George Smith Morison
by Brown & Critchlow
his Attorneys

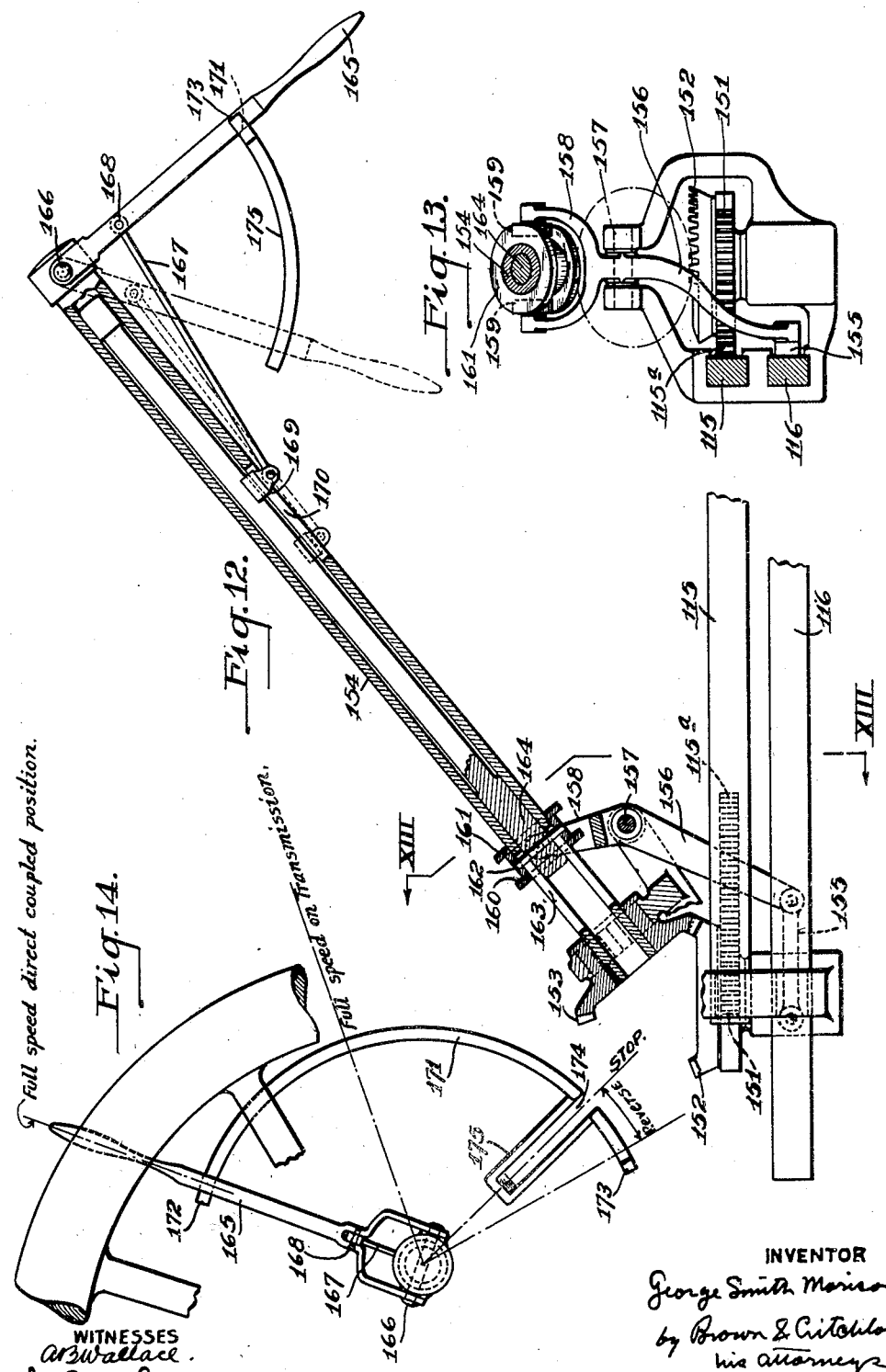

Patented Aug. 4, 1931

1,817,159

UNITED STATES PATENT OFFICE

GEORGE SMITH MORISON, OF PITTSBURGH, PENNSYLVANIA, ASSIGNOR TO MORISON INCORPORATED, OF PITTSBURGH, PENNSYLVANIA, A CORPORATION OF DELAWARE

TRANSMISSION MECHANISM

Application filed September 24, 1927. Serial No. 221,664.

This invention relates to transmission mechanism, and more particularly to means for translating rotation of one shaft to rotation of another shaft and for varying the ratio of relative rotation therebetween.

Among the objects of the invention is to provide a power transfer device adapted to transmit power at a gradually and infinitely variable ratio from a driving to a driven shaft without greatly varying its transmission efficiency.

An object of the invention is to combine a device for transferring rotation of a drive shaft to rotation of a driven shaft through a differential planetary gear train having a governing element adapted to permit progressive infinite variation of ratio of rotation between the drive and driven members, with means to by-pass the reaction of a governing element to the drive shaft, whereby to utilize all of the applied power for producing rotation of the driven shaft.

An object of the invention is to provide a transmission mechanism of the above designated character which may be reversed in operation; and which is adapted, when desirable, to effect a direct connection of the drive and the driven shaft, without utilizing the ratio-varying mechanism at all.

An object of the invention is to provide a power transmission change speed gear mechanism in which regulation of speed within the ratio range of the device is effected without shifting or releasing gear wheels, and independently of the speed of the prime mover, which may be constant.

An object of the invention is to provide transmission mechanism which is comparatively quiet in its operation, and which embodies a simple manual control mechanism of a character which greatly facilitates the changing of speed.

An object of the invention is to provide a transmission mechanism of the above designated character in which the speed changes are effected through a planetary differential gear mechanism controlled by a roller friction governing mechanism, which mechanisms are adapted to operate independently of a friction clutch such as is commonly used in gear shift transmission systems for automobiles of the present type.

An object of this invention is to provide a transmission mechanism which has slight relative movement of the gear wheels and in which the gears may be entirely cut out of action when the mechanism is operated at full speed, whereby wear on the gear teeth is minimized and noise incident to the operation of gear wheels greatly reduced.

An object is to make such a transmission that it may be readily assembled and disassembled without special tools or skill.

Many other advantages of the infinitely variable, non-shift transmission to be described will be apparent to those familiar with this art.

In step-up change speed gears, particularly for automobiles, it is necessary to provide at least two or three step-up power transmission ratios to meet the requirements of the varying loads in order that the motor may use its power to the best advantage. The ideal transmission mechanism for obtaining maximum motor operating efficiency is one that combines a gradually uniformly variable transmission ratio with high efficiency. In transmission mechanisms embodying uniformly infinitely variable action as heretofore proposed, numerous difficulties have been encountered, one of which is loss of efficiency in an endeavor to obtain a wide range of ratios.

By the present invention these difficulties are met and the invention embodies the features of a gradually uniformly infinitely variable action coupled with a high transmission efficiency. In addition the direction of transmission is reversible, and a direct 1-to-1 connection of the engine with the driven or propeller shaft is provided for. That is done by short-circuiting, or by-passing, or driving straight through the ratio-variable-mechanism. That is to say by direct connection of drive and driven shaft, not involving the ratio-varying mechanism.

Figure 2:
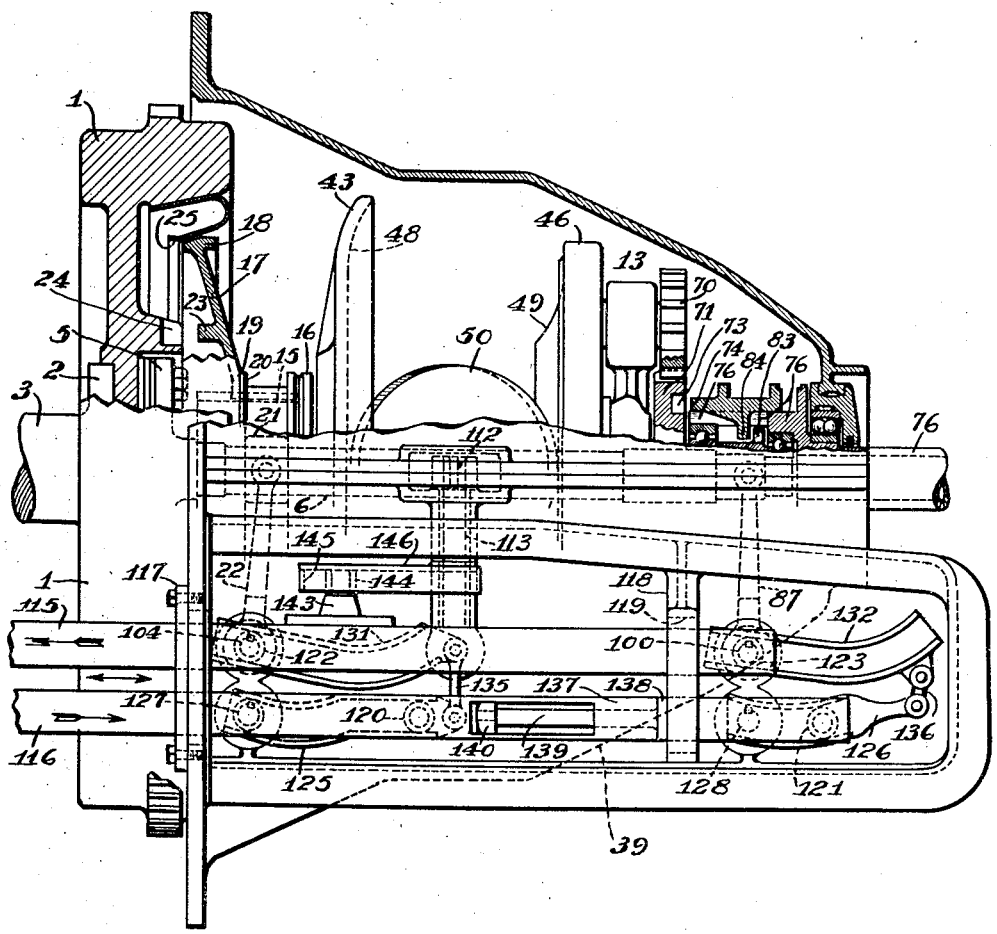
Figure 3:
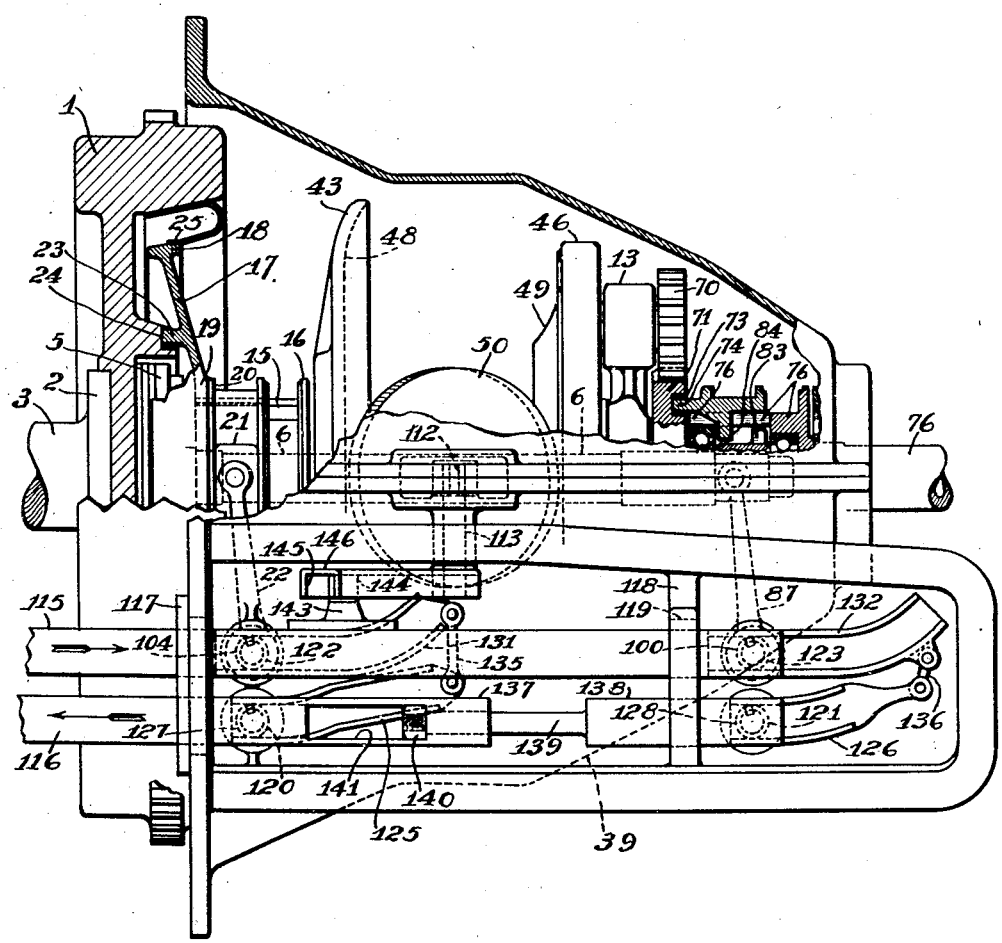
Figure 4:
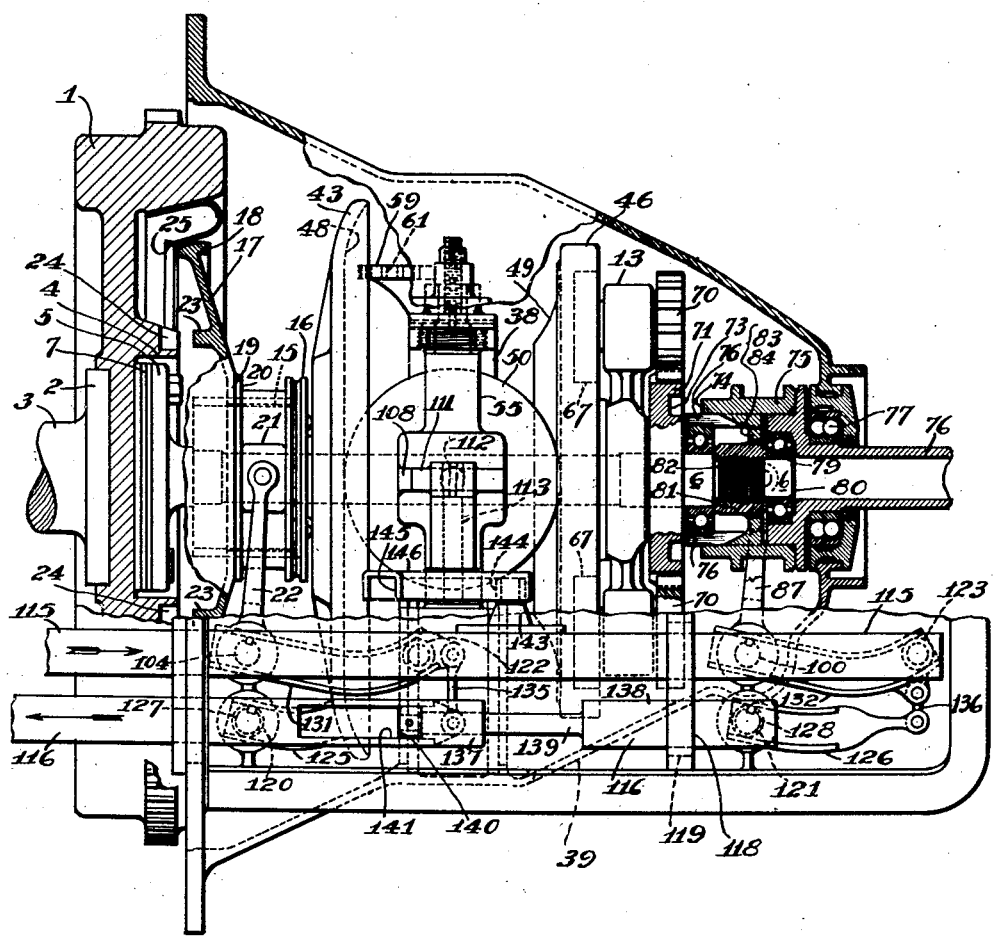
Figure 5:
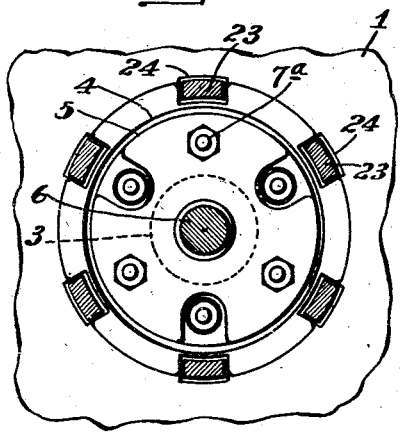
Figure 7:
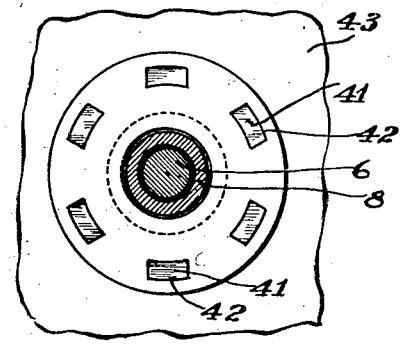
Figure 9:
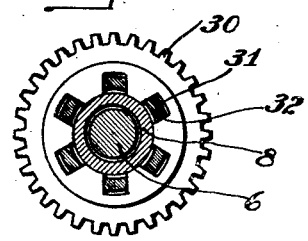
Figure 15:
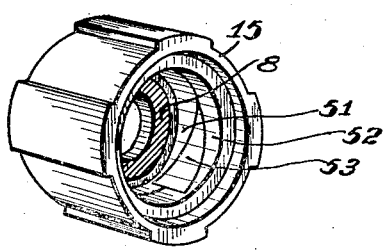
Figure 16:
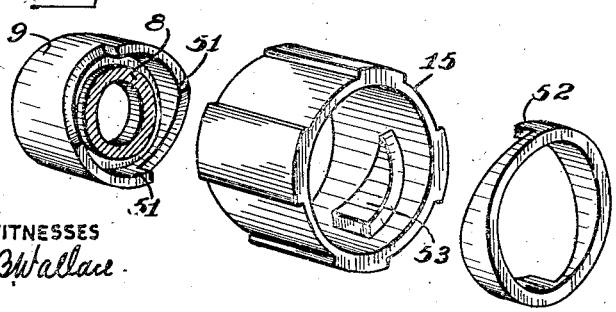

In the accompanying drawings, Fig. 1 is a horizontal sectional view of a transmission mechanism embodying the principles of this invention; Figs. 2, 3 and 4 are side elevational views partially in section; Figs. 5 to 10 inclusive are sectional elevational views taken along the lines V—V, VI—VI, VII—VII, VIII—VIII, IX—IX, and X—X, respectively on Fig. 1; Fig. 11 is a plan view of segment gears of Fig. 8; Fig. 12 is a side elevation and partial section of the control lever; Fig. 13 is a transverse sectional view partially in elevation taken along the lines XIII—XIII of Fig. 12; Fig. 14 is a plan view of a control lever and segment guide therefor; Fig. 15 is a perspective view inside sleeve 15; and Fig. 16 is a disassociated elevational view of the parts of Fig. 15 in line.

Referring to Fig. 1, the structure therein illustrated comprises a fly wheel 1, mounted centrally on the flanged end 2 of an engine crank-shaft 3. The shaft 3 could, of course, be driven by any suitable form of prime mover, such as a motor, etc., as well as an engine. The fly wheel is provided with a counterbore 4 which is adapted to receive the flanged end 5 of a primary drive shaft 6, secured to the fly wheel by a plurality of flexible coupling elements 7. The coupling elements 7 are alternately secured by bolts 7—A to the web of the fly wheel 1 and to the flange 5 of the shaft 6, as shown in Fig. 1.

Mounted coaxially on the shaft 6 is the transmission mechanism, which may rotate with the transmission shaft 6, but also may be free with respect thereto, when connecting clutches are free. The transmission mechanism comprises a secondary driving quill shaft 8, having a flanged end 9 counterbored for receiving anti-friction bearings 10. Its rear end is provided with a screw threaded portion 11 adapted to engage a cooperating threaded portion formed interiorly on the hub 12 of a spider 13 that carries the planetary members of a differential transmission mechanism. The hub 12 of the spider member 13 is journalled on anti-friction bearing 14 on the transmission shaft 6 and this bearing with the bearing 10 constitutes the quill shaft 8 an independently rotatable member coaxial with the central transmission shaft 6.

Mounted on the flange 9 of the quill shaft 8 is a sleeve 15 having an outwardly flanged end 16, and mounted on the sleeve 15 and in splined engagement therewith as shown in Fig. 1, is a clutch element 17, having a peripheral portion 18 of frusto-conical shape, and having a hub portion 19, the periphery of which is provided with a groove 20 adapted to receive trunnion members 21 of a clutch lever 22, shown in Fig. 4. The clutch element 17 is adapted for sliding movement on the sleeve 15 and is provided with lugs or teeth 23 that are adapted to be engaged by slots or notches 24 of the fly wheel member 1. The tapered peripheral portion 18 of clutch element 17 is further adapted to engage the inner face of a yielding engaging clutch element 25, secured to rotate with the fly wheel 1, for a purpose hereinafter stated.

Mounted concentrically on the quill shaft 8 is a sleeve member 27 having a flanged end 28 and a screw thread portion 29, the latter interacting with an interiorly formed threaded portion of a miter bevel gear 30 having notches 31 therein for receiving projecting lugs 32 provided on the end of hub member 12. The gear 30 rotates with sleeve 27 and hub 12. See Figs. 1 and 9. Miter bevel gear 30 is in gear tooth engagement with a pair of complementary gear elements 35, Fig. 8, which are journalled by anti-friction bearings 36 to a trunnion member 37 that is mounted in a transverse frame portion 38 set in the transmission housing 39. Miter wheels 35 mesh with the teeth of a miter gear 40, Fig. 1, having a hub portion with lugs 41 which are positively engaged by slots 42 of a roller disc 43. The miter gear 40 and roller disc 43 are rotatably journalled on thrust bearings 44 and 45, respectively, in the manner shown in Fig. 1. The disc 43 is by this arrangement rotatably mounted coaxially with the quill shaft 8 and positively connected thereto through gears 30, 35 and 40, so it always rotates with and at the rate of rotation of the quill shaft 8, but in an opposite direction.

The second roller disc 46 is journalled to rotate on hub portion 12 of the planetary member 13 by means of thrust bearings 47. The discs 43 and 46 are provided with curved concave opposed faces 48 and 49, respectively, which are adapted for frictional engagement with a pair of compression members or rollers 50, the outer peripheries of which are shaped complementary to the curvature of the faces 48 and 49 of the discs 43 and 46, so as to have a line contact therewith.

Discs 43 and 46 are operatively pressed against the outer faces of the rollers 50 by the mechanism illustrated in Figs. 15 and 16. Disposed within the exteriorly splined sleeve 15, which constitutes an envelope member for them, are a fixed thrust collar 51 which is attached to or integral with flange 9 of the quill shaft 8 and a separate slidable thrust collar 52, retained betwen the flange 9 of the hollow shaft 8 and one of the ball races of the bearing 45.

Figure 6:
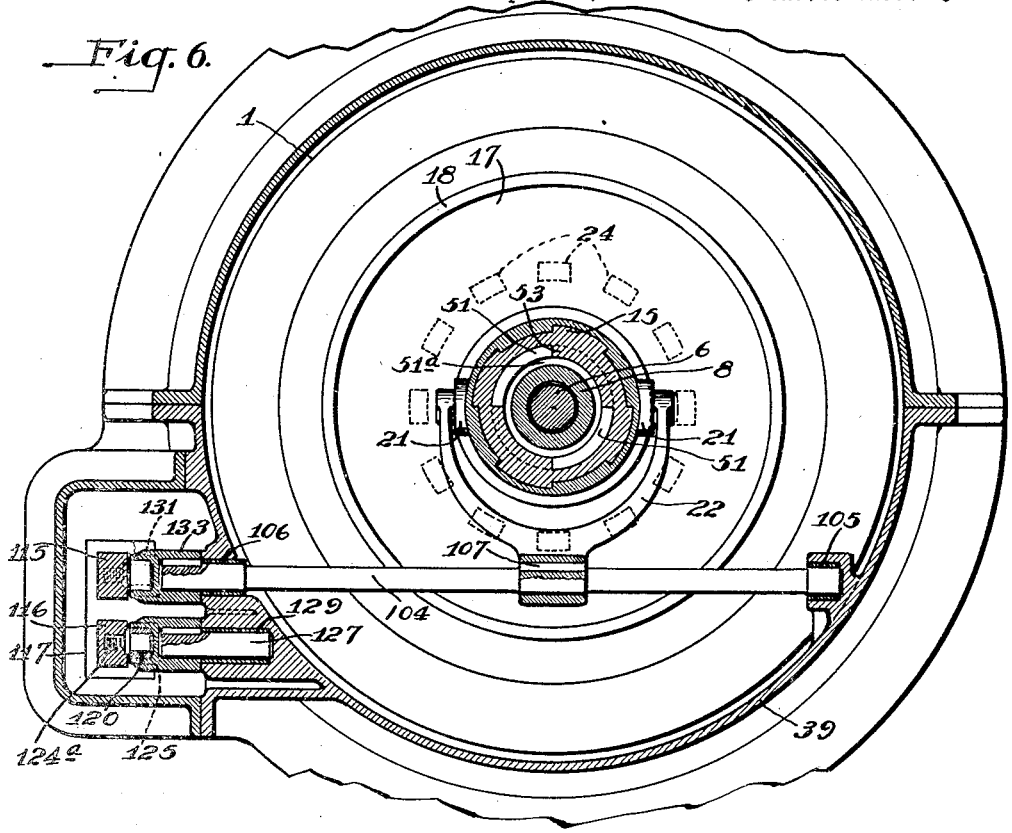

As shown in dotted lines in Fig. 1, and as is more clearly shown in Figs. 6, 15 and 16, the splined envelope sleeve 15 is provided with a pair of interior opposed wedge shaped tongues 53, disposed in complementary shaped notches between the thrust rings or collars 51 and 52, formed by inclined faces on the opposed faces of those rings. The tongues 53 are therefore adapted to exert a separating thrust on the rings or collars 51 and 52, tending to separate them in an axial direction when the envelope sleeve 15 is rotated. The ring 51 is shown as integral with flange 9 of quill shaft 8, but it may be attached in any suitable manner.

The axial pressure produced by the separating displacement of the members 51 and 52 exerts a thrust through bearing 45 against disc 43 to press the latter against rollers 50. Similarly the thrust reacting on the flange 9 of the hollow shaft 8 displaces disc 46 in an axial and opposite direction against rollers 50 through thrust bearings 47. The disc 43 is freely movable in an axial direction by virtue of its slotted engagement with miter gear 40, and the hollow shaft 8 is similarly movable by the provision of ample clearance between roller bearing 10 and the end of the counterbore formed in the end flange 9 of shaft 8. Accordingly, when a rotating force is applied to splined sleeve 15, displacement of the discs 43 and 46 toward each other will take place on account of pressure exerted by thrust collars 51 and 52. This results in compressing the rollers 50 between the discs.

It will be seen that shaft 3 is effectively a prime mover, but as shaft 6 is positively connected to it, the latter is sometimes referred to herein as the drive shaft. Quill shaft 8 is mounted on shaft 6 so as to be positively rotatable therewith and at the same speed, when clutch 17 is engaged with the fly wheel, but when the clutch is not engaged it is entirely free from and hence freely rotatable with respect to shaft 6. Thus the quill shaft 8 is both a drive and a driven shaft; when clutched to shaft 6 through fly wheel clutch 17 it is driven thereby, but becomes a positive part of the drive mechanism and itself drives spider 13 and the planetary gears it carries, also gear 30, and through that and gear 35 and 40, it drives disc 43. Quill shaft 8 is therefore in certain combinations referred to as a drive shaft, or a secondary drive shaft, but shaft 76 is generally referred to as the driven shaft.

A coil spring 51a is positioned under constant compression between flange 9 and thrust bearing 45. This keeps the several slidable members from being loose when they are not operating.

Figure 8:
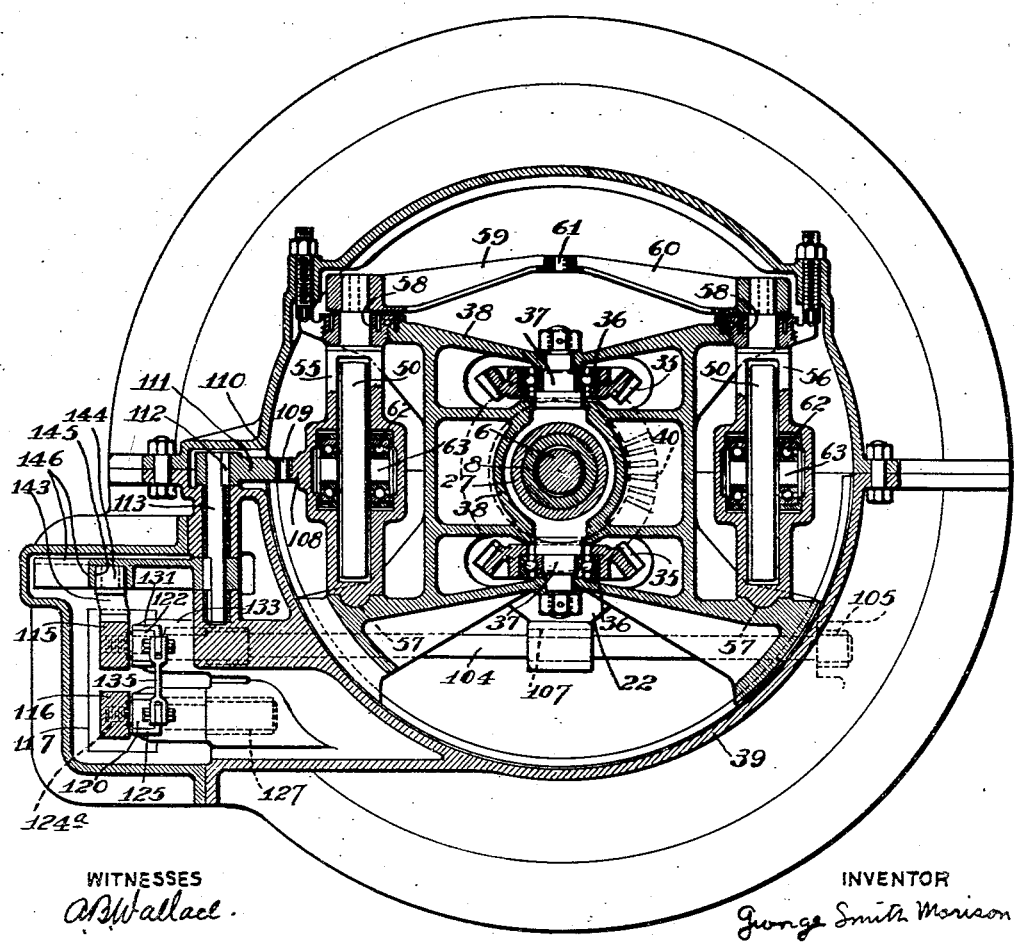

The rollers 50 are mounted to be angularly adjustable relative to the discs 43 and 46 by means of the following mechanism: Referring to Figs. 8, 14 and 15 of the drawings, the rollers 50 are disposed in a pair of slotted spindles 55 and 56, the ends of which are supported by semi-spherical bearings 57 in complementary shaped seats formed in the transverse frame portion 38 set in the transmission housing 39. The upper portions of the spindles 55 and 56 are also journalled at their bearing portions 58 in the frame 38, and are respectively positively engaged at their outer ends by a pair of segment gears 59 and 60 connected to each other by virtue of intermeshing gear teeth 61. By this arrangement the spindles 58 are positively connected so that they must always rotate simultaneously in opposite directions at the same rate. The rollers 50 are journalled in anti-friction bearings 62, fitted in spindles 55 and 56, the rollers being provided with short hub members 63 for that purpose.

Again referring to Fig. 1 of the drawings, the roller disc 46 is provided with peripheral internal gear teeth 65 which may be formed integrally with the disc or formed on a separate gear ring 66, secured to the flange of the disc 46, as shown. The gear ring 66 of the roller disc 46 constitutes a fulcrum member for a planetary differential gear mechanism, and is in constant gear tooth engagement with a plurality of planetary gears 67, fixed on the ends of shafts 68 journalled for rotation in bearings 69 of the spider member 13. Gears 70 are fixed to the other ends of the shafts 68 and are preferably of the same number of teeth and dimensions as gears 67, but not necessarily so. Planetary gears 70 mesh with a sun gear 71 which is journalled for rotation on bearing 72 on the transmission shaft 6. The sun gear 71 is provided with notches or slots 73, Figs. 1 and 10, which are adapted to be engaged by teeth 74 of a jaw clutch 75, which is axially movable in the splined end portion of the driven or propeller shaft 76 as shown in Figs. 1 and 10.

The driven shaft 76 is journalled by a ball bearing 77 in the transmission housing 39 and its inwardly projected end is supported on a bearing 78 which is carried by the transmission shaft 6. The expanded end portion of the shaft 76 is counterbored and fitted with a bearing 79 adapted to receive a constricted end portion 80 of the transmission primary drive shaft 6. A clutch element 81 provided with an interiorly threaded portion 82 is mounted on the end of shaft 6 in threaded engagement therewith as shown and is further provided with radial slots 83, Figs. 2 and 10, which are adapted to engage inwardly projecting radial teeth 84 of the clutch member 75, for a purpose hereinafter stated. The clutch 75 is provided with a grooved periphery 85 adapted to receive trunnion members 86 for engagement with a bifurcated lever 87.

Figure 10:
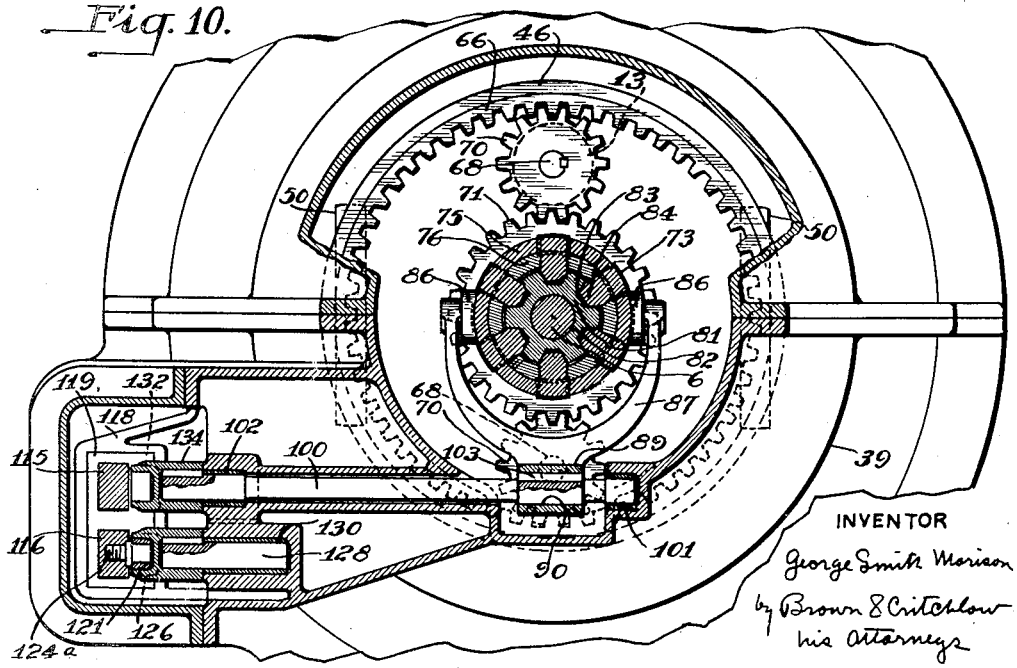
Figure 11:
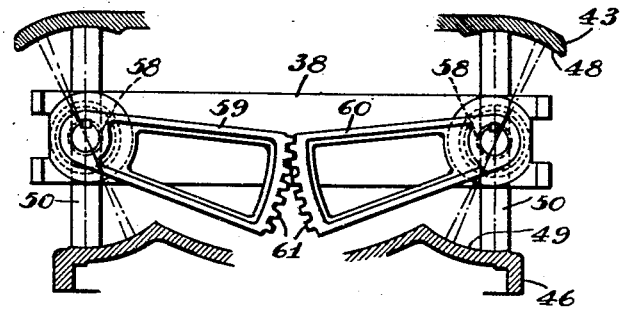

Referring to Fig. 10 of the drawings, the clutch element 75 is operatively connected to the bifurcated lever 87, which is provided with a shank 89 having an opening 90 for receiving a shaft 100. The shaft is journalled at one end in a bearing 101 secured in the transmission housing and at its other end in a bearing 102 secured in the housing. The lever 87 is secured to the shaft 100 by a key 103.

Referring to Fig. 6 of the drawings, the clutch element 17 of Fig. 1 is controlled by its bifurcated lever 22 mounted on a shaft 104 in the same manner as the lever 87 of the rear clutch element 75. The shaft 104 is journalled to rotate in the bearings 105 and 106 mounted in the transmission housing as shown, and the bifurcated lever 22 is secured to the shaft by a key 107.

Referring to Figs. 1 and 8 of the drawings, the slotted spindles 55 and 56 carrying the rollers 50 are adapted to be operated by the following mechanism: As previously explained the spindles 55 and 56 are operatively connected by segment gears 59 and 60 to be simultaneously operative in opposite directions of rotation on substantially vertical axes. Accordingly it is only necessary that one of the spindles be actuated to impart rotative axial movement to both of the spindles. To accomplish this the spindle 55 is provided with an offset portion 108 provided with gear teeth 109 adapted to interact or mesh with the teeth 110 of a gear segment 111. The member 111 is secured by key 112, to a vertically disposed shaft 113 that is rotatably journalled in an offset portion of the transmission casing, as shown in Figs. 1 and 8.

There are three adjustable control elements of the transmission mechanism, namely, the front clutch element 17, the intermediate rollers 50 for governing the fulcrum gear of the planetary unit of the transmission mechanism, and the rear clutch element 75. And these elements are controlled and actuated by a pair of bars 115 and 116 shown in Figs. 2, 3, 4 and 16, the bars being operated by a suitable control mechanism shown in Figs. 12, 13 and 14, to be hereinafter explained.

The clutch elements and the roller actuating mechanism are operatively connected to the bars 115 and 116 by suitable mechanical linkage as follows: The operating or control bars are supported in the flange of the transmission casing at one end by a guide block 117, Figs. 1, 2, 3, 4, and 6, and further supported in a web portion 118, Figs. 1, 2, 3 and 4 of the transmission housing, which carries a second guide block 119. The blocks 117 and 119 are provided with substantially rectangular openings of the shape of the bars 115 and 116 and the latter are freely movable in their supports. Rollers 120 and 121 are mounted by pins 124a on the lower bar 116, and rollers 122 and 123 are similarly mounted by pins 124a on the upper bar 115, the rollers projecting from the sides of the bars as shown in Figs. 6 and 10. The rollers 120 are shown in Fig. 6, and rollers 121 in Fig. 10.

The rollers of the slide bars are adapted to cooperate with a plurality of cam links as follows: The rollers 120 and 121 of the lower bar 116 are cooperatively disposed in the slots of cam links 125 and 126 respectively. The links are keyed respectively at one end by projecting bosses to shaft 127, Fig. 6, and shaft 128, Fig. 10, which are journalled in bearings 129 and 130 secured in the transmission housing in the manner shown. Similarly the rollers 122 and 123 of the top bar 115 are disposed in the slotted portions of cam links 131 and 132, which are provided with bosses 133 and 134 by means of which they are respectively keyed to the end of the clutch lever operating shafts 104 and 100, Figs. 6 and 10, which operate the bifurcated clutch levers 22 and 87 of the front and rear clutch elements, respectively. Cam links 125 and 131 are pivotally connected at their extended ends by link 135 to be jointly operative, and cam links 126 and 132 are similarly connected by a link 136. See Fig. 2.

The lower operating bar 116 is of two-piece construction, comprising the members 137 and 138, the former being provided with a central opening for receiving a reduced extension 139 of the bar 138. The end of the member 139 is provided with a screw thread portion for receiving a threaded nut 140, and the bar 137 is provided with an elongated slot 141 adjacent the opening in which the member 139 is disposed for the purpose of permitting a certain degree of movement of the nut 140 therein for a purpose to be hereinafter stated.

The upper bar 115 is adapted to control the angularity of rollers 50 by means of the following mechanism: Mounted on the upper face of the bar 115 is a flanged boss 143, Figs. 2, 3 and 8, on which a roller 144 is mounted similarly to the mounting of the side rollers 122 and 123 for operating the cam links as previously explained. The roller 144 is cooperatively disposed in the slotted portion 145 of a cam lever 146 one end of which is keyed to a vertical spindle 113, (Fig. 8), which carries the gear segment 111 that operates the slotted spindles 55 and 56 in which the rollers 50 are mounted, as previously explained. See Fig. 1.

The cam links 125 and 126, 131 and 132, and the cam lever 146 are provided with guide slots in which the rollers of the operating bars are disposed, which slots are shaped to impart certain angular movement of the cam links and cam levers in accordance with the relative position of the operating bars 115 and 116 as effected by a lever control mechanism presently to be explained. The movement imparted to the links and cam lever by their respective rollers is effective in operating the front and rear clutch elements 17 and 75, and the roller governing mechanism to obtain ratio changing by means of the transmission mechanism, in a manner hereinafter explained in connection with the operation of the device.

The control mechanism for regulating the operating bars 115 and 116 will be explained in connection with Figs. 12, 13 and 14 of the drawings in which the bar 115 is shown provided with gear teeth 115a which constitute a rack that meshes with the teeth of a spur gear wheel 151, formed integrally with or joined to a bevel gear member 152, the teeth of which interact or mesh with a bevel gear wheel 153 secured to the end of a hollow spindle 154. Rotation of the spindle 154 causes axial movement of the operating bar 115 in its supports 117 and 119 illustrated in Figs. 6 and 10, respectively.

The operating bar 116 is pivotally connected by a link 155 to one end of a bell crank 156, fulcrumed at 157, and provided with a bifurcated end 158 that engages a pair of trunnion members 159 disposed in the grooved periphery 160 of a guide collar 161. The collar 161 is axially movable on the hollow spindle 154 and is adapted to be moved thereon by its connection with a pin 162 that projects through a slotted opening 163 in the shaft 154. The pin 162 is secured in the end of a spindle 164 disposed in the central opening of the hollow shaft 154.

Hollow shaft 154 and spindle 164 are operated by means of a common hand lever through the following mechanism: The hand lever 165 is secured to the end of the hollow spindle 154 and is pivotally connected thereon at 166 to be angularly movable in one direction only, as shown in Fig. 12. The hand lever 165 is connected by a link 167 at 168 and the link is pivotally connected to a bracket 169 secured to the spindle 164 and projecting through a slotted portion 170 of the hollow spindle 154 to adapt it for axial movement therein. The hand lever 165 cooperates with a segment guide 171 provided with stops 172 and 173 at the respective ends thereof, and which function to limit the angular movement of the hand lever 165. Movement of the latter between the stops 172 and 173 produces rotation of the hollow spindle 154, which, through its gear connection to the bar 115, effects axial movement of the latter in its supports. Provided near one end of the segment 171 is a slotted portion 174 having a depending guide 175 into which the lever 165 may be lowered by virtue of its pivotal connection at 166 to the spindle 154. Movement of the control lever in the guide 175 drives link 167, which, through its connection to the spindle 164, produces axial movement of the latter. This actuates the bell crank 156 and the bar 116 with which it is connected.

By the mechanism above described, the ratio of relative rates of rotation of discs 43 and 46 may be varied at will. The disc 43 is positively connected to the quill shaft 8 through gears 40, 35 and 30, and must rotate when that shaft rotates, though in opposite direction. Spider 13 is likewise connected to shaft 8 and must have the same rotative speed. Disc 46 is connected through gears 66, 67, shafts 68, planetary gears 70 and sun gear 71, to driven shaft 76, with an intermediate releasable clutch 75.

The ratio of rotations of discs 43 and 46 is governed by the angular position with respect thereto of rollers 50, since the discs are pressed firmly against the rollers so that slippage is prevented. Disc 46 normally receives driving force through its attached orbit gear 66 from planetary gears 67, revolved by spider 13 carried on quill shaft 8, and rotates faster or slower than disc 43 according to whether rollers 50 contact with disc 46 at a less or greater radial distance from the axis of disc 46 than the distance of the point of contact of the rollers 50 with disc 43 from its axis, respectively. Rotation of disc 43 is constant with, and is determined by rotation of quill shaft 8, to which it is positively geared.

The speed of rotation of disc 46 is a factor in the rate of rotation on their axes of planetary gears 67, 70, which are fixed on common shafts and engage orbit gear 66 carried by disc 46, and the rate of rotation of planetary gears 67, 70 is a factor in driving the sun gear 71, which is mounted to be clutched to the shaft 76 to which power is to be transmitted.

The rate of rotation of disc 43 and spider 13 being positively determined by rotation of the quill shaft 8, the rate of revolution of gears 67, 70 being positively determined by rotation of spider 13, which in turn is positively controlled by rotation of shaft 8, the ratio of rotation of disc 46 compared to that of disc 43 being variable at will by control of angularity of rollers 50, any change in rate of rotation of disc 46, without change of rate of rotation of disc 43, must react through the planetary gear system comprising gears 66, 67, 70 and 71, which are constantly in mesh, and must result in a change of rate of rotation of sun gear 71.

Since sun gear 71 is clutched to the driven shaft 76, in all speed changing operation it will be obvious that change of angularity of rollers 50 between discs 43 and 46, while the rate of rotation of disc 43 remains constant, will produce change of rate of rotation of gear 71 and hence of the driven shaft 76. Since the rate of rotation of disc 43 is directly and positively controlled by the engine shaft 3 to which primary drive shaft 6 and secondary driving quill shaft 8 are positively engaged, the speed or rotation ratio of the drive and driven shafts are thus directly governed or controlled by varying the angular adjustment or position of rollers 50.

The variable compensating function of mere planetary gear systems is well known and need not be further described at this point. The variation of rate of rotation of disc 46 is reflected through the planetary gear system and results in corresponding variation of rotation of sun gear 71 and consequently of driven shaft 76, to which the sun gear is positively connected by a clutch, as described.

By controlling the rate of rotation of disc 46 by means of rollers 50, which also constantly bear against disc 43, the back pressure resulting from the action of gear 66 as a fulcrum for planetary gears 67, 70 reacts through disc 43, which is attached indirectly to the drive shaft. Hence there is practically no lost power from the force exerted by or on the fulcrum gear 66, as is the case where brakes are used to retard the orbit fulcrum gear of planetary systems as heretofore used for somewhat similar variable speed transmission devices. The present arrangement in effect by-passes the energy applied to control the speed of the disc 46 back into the engine drive shaft, and adds a forward driving force thereon. Or stated another way, the power exerted to govern rate of rotation of disc 46 is by-passed to the power shaft so that the governing force is not lost energy but is applied to the primary driving power by reaction. The retarding element in effect fulcrums and reacts on the driving shaft so as to by-pass the retarding force back to the driving force.

It will be observed that all the parts of the transmission may be readily assembled and disassembled. Most of them may be removed by merely slipping off rearwardly on the axis of the drive shaft.

The operation of the transmission mechanism will now be briefly described, in connection with Figs. 1 to 4 inclusive and 16 to 18 inclusive of the drawings. As previously stated in connection with the description of the mechanism, there are three manually adjustable controlling elements of the transmission, namely, the front clutch 17 for connecting the transmission to the fly wheel of the engine, the rear clutch element 75 which functions to connect the driven or propeller shaft to the driving shaft, either through the speed ratio-controlling transmission, or direct to the driving shaft 6, which is coupled to the engine fly-wheel for driving straight through the transmission. This latter arrangement by-passes the differential transmission entirely. The other adjustable mechanism comprises the ratio-governing control for the differential, which is adjustable for progressively variable transmission ratios. This is effected by the angular disposition of the compression rollers 50 between the disc 43 and the disc 46, the latter carrying the fulcrum gear of the differential mechanism.

The three elements referred to are operated through control bar 115, which is actuated by control lever 165 when the latter is subjected to angular movement between stops 172 and 173 of its segment guide 171. The front and rear clutch elements are shifted by the movement of bar 116, which is actuated by folding movement of lever 165 when it is depressed in guide 175, which registers with the notch or opening 174 in the segment guide 171, as previously explained.

The front and rear clutches 17 and 75 are respectively operated by their levers 22 and 87, which are secured for angular movement to shafts 104 and 100, and the shafts in turn are subjected to angular movement by actuation of cam links 131 and 132.

In Fig. 2 of the drawings the transmission mechanism is illustrated with the clutch elements 17 and 75 disengaged from the fly wheel and the sun gear 71 of the differential gear mechanism, respectively. The rear clutch 75 which is splined on the propeller shaft 76 is also disengaged from member 81 on transmission shaft 6, and from gear 71, and in this position of the clutch elements the engine may be operating idly without either affecting the transmission or the quill drive shaft 8. This may be designated as the idle or stop position so far as the transmission mechanism is concerned, and in this position regulating rollers 50 are normally in the position shown in dotted lines in Fig. 1.

To effect the withdrawal of the clutches described above the hand lever must be depressed in its guide 175 as shown in dotted lines in Fig. 16 and control bar 116 is thus extended to its extreme right hand position indicated by an arrow in Fig. 2 by virtue of its mechanical linkage with the operating lever 165 as explained.

The next step in the manipulation of the single control lever 165 in operation of the transmission mechanism, consists in raising the lever in its guide to bring it to the plane of the top face of segment guide 171 without disturbing its position relative to the notch 174 in the guide segment. By this raising of lever 165 operating bar 116 is moved in a left hand direction as indicated by the arrow in Fig. 3, and during this movement roller 120 of the bar 116 traverses the straight portion of the groove or slot in link 125 whereby the angular disposition of the latter is not disturbed. The roller 121 on the portion 138 of the operating bar 116 is not moved during this preliminary movement of roller 120 on account of the loose connection at the portions 139 and 141 of the bars 116 which portions are slidable within each other for a distance equal to the length of slot 141. When bar 116 is moved to its extreme left as shown by the arrow in Fig. 3, which is the position in which hand lever 165 is in the plane of the face of the segment guide 171, the roller 120 will have traversed the length of the groove in link 126. As roller 120 contacts with the curved portion of the groove in link 125, the latter will be raised to the position shown in Fig. 3 and by virtue of its connection with cam link 131 through link 135 the link 131 will be raised from its position of Fig. 2 to its position of Fig. 3, which produces angular movement of shaft 104, moving the front clutch 17 into engagement with the fly-wheel 1 of the engine.

Similarly and simultaneously roller 121 of bar 116 will, by its engagement with the curved groove of link 126, raise the latter from its position of Fig. 2 to the position shown in Fig. 3 and by virtue of its connection with cam link 132 through link 136 cam link 132 will be displaced from the position of Fig. 2 to the position of Fig. 3, thereby effecting rotative movement of the shaft 100 that actuates rear clutch lever 87 and connects rear clutch element 75 with sun gear 71 of the differential gear mechanism.

The distance of travel of rollers 120 and 121 and the curvature of the guide slots in links 125 and 126 are so proportioned that front clutch element 17 will engage the yielding friction element 25 of the fly-wheel at its front frusto-conical rim portion 18 in advance of any movement of the rear clutch element 75. Since fly-wheel 1 of the engine is operating when the portion 18 of the front clutch 17 engages yielding element 25 thereof, the front clutch 17 will be actuated to rotate before its jaws or lugs 23 are in engagement with notches 24 of the fly-wheel. The purpose of this preliminary engagement of the clutch element is to bring the transmission elements up to the speed of the fly-wheel to prevent the clashing of the clutch teeth when they are engaged by the notches or teeth 24 of the fly-wheel member. When operating bar 116 is in its extreme left position the front clutch and rear clutch elements will be respectively engaged with fly-wheel 1 and sun gear 71.

With the engine operating, the engagement of the front clutch 17 with the fly-wheel will produce rotation of sleeve 15 with which it is splined, quill shaft 8 which is connected to rotate with the splined sleeve 15 by engagement of internal lugs 53 with the fixed collar 51, carried by quill shaft 8, planetary element 13 of the differential gear mechanism which is in screw thread engagement with the end of quill shaft 8, miter gear 30 which is engaged by projecting teeth 32 on the hub 12 of planetary member 13, the associated miter gears 35 meshing with gear 40, and roller disc 43 which is interlocked with miter gear 40. These parts, except gears 35, rotate about the common axis, which is that of shaft 6, at engine speed of rotation.

As previously explained, when the front clutch element 17 is engaged with the fly-wheel and subjected to rotation, thrust collars 51 and 52 are separated and their displacement exerts axial pressure in opposite directions against roller disc 43 through thrust bearing 45, and against roller disc 46, through thrust bearing 47 to compress rollers 50 therebetween. Since operating lever 165 will still be in its stop position as indicated on the segment guide, rollers 50 will be in the stop position indicated in dotted lines in Fig. 1 and when disposed in this manner the line of contact of the rollers, which is intended to be substantially the middle plane of the rollers, will be in engagement with the respective discs. In this position of rollers 50 the speed ratio of disc 46 to that of disc 43 will be such that with disc 43 operating at engine speed the disc 46 will necessarily operate at greater speed. The relative speeds of the discs 43 and 46 with rollers 50 in their "stop" position, as indicated by dotted lines in Fig. 1, and with the parts proportioned as there shown, is 2-to-3. Therefore when disc 43 is rotating at 1000 R. P. M. engine speed, disc 46 will rotate at 1500 R. P. M.

Internal gear 66 is carried by disc 46, and it is in mesh with integral planetary gears 67 and 70, which in turn mesh with sun gear 71. Gears 67, 70 are revolved by members 13, which rotates at engine speed, the same as disc 43, i. e. 1000 R. P. M., in the present illustration. With the gears proportioned as here shown, when gear 66 is driven at 1500 R. P. M. and gears 67, 70, in mesh therewith are being revolved at 1000 R. P. M., the sun gear 71 will be idle. If gear 66 is allowed to rotate at 1250 R. P. M. the sun gear 71 will then be driven sufficiently to cause the peripheral speed of gears 67, 70 to equal the peripheral speed of gear 66, with the algebraic addition of peripheral speed caused by revolution of the gears 67, 70, by rotation of their carrying member 13. That will be 500 R. P. M. in the same direction as that of rotation of gear 66. The gears 67, 70 are thus controlled as to rate of rotation by the rate of rotation of the moving fulcrum gear 66. And they in turn control rotation of gear 71, about which they revolve.

The parts are designed in the present case so that with engine speed at 1000 R. P. M. and rollers 50 in "stop" position as illustrated in Fig. 1, the disc 46 will rotate at 1500 R. P. M. and sun gear 71 will not rotate at all. For each decrease of 1 R. P. M. of gear 66 there will be an increase of 2 R. P. M of gear 71, until they become equal at 1000 R. P. M. At that point the engine may be direct coupled to the shaft 76, as above described.

Upon movement of control lever 165 on its segment guide 171 from stop position and in the direction marked "full speed on transmission" the angularity of governing rollers 50 will be changed toward the position marked "full speed position" in Fig. 1 of the drawings. As previously explained the front clutch 17 has been connected with fly-wheel 1 and rear clutch element 75 has been connected with the sun gear 71 through its clutch teeth 74 disposed in the notches 73 of the sun gear 71. As lever 165 is subjected to progressive angular movement on its guide in direction of full speed operation, operating bar 116 will be moved to the right as shown by the arrow in Fig. 3. During the initial movement of the bar, rollers 122 and 123 traverse only the straight portion of the groove in cam links 131 and 132, whereby the position of the front and rear clutches are not disturbed. During this movement of the rollers 122 and 123 through the straight portions of the links 131 and 132, roller 144 operating in the groove 145 of cam lever 146, traverses the curved portion of the latter, illustrated in Fig. 1, causing movement of cam lever 146 around the axis of shaft 113 to which it is keyed. Rotation of shaft 113 produces angular movement of segment gear 111 which is secured to rotate with shaft 113, and movement of the segment gear by virtue of its teeth engaging cooperating teeth on the slotted spindle 55, will effect angular movement of the latter to adjust the angular position of roller 50 carried thereby. Movement of spindle 55 will also produce simultaneous angular movement of spindle 56, is its bearing in the opposite direction, by virtue of its connection through segment gears 59 and 60, shown in Fig. 8. Roller 50 carried by spindle 56 is thus adjusted relative to the discs 43 and 46, simultaneously with adjustment of the roller 50 by its spindle 55.

Continued movement of operating bar 115 in the right hand direction will gradually adjust the angularity of rollers 50 until they reach the "full speed position" shown in Fig. 1. In that position the fulcrum gear 66 of the differential gear mechanism will be rotating at engine speed having progressively dropped from a speed of 1500 R. P. M. at the "stop" position of rollers 50 to the engine speed of 1000 R. P. M.

As the speed of fulcrum disc 46 is gradually decreased by the angular adjustment of rollers 50, the sun gear 71 must gradually increase in rate of rotation, commencing at zero, and this progressive increase of driven rotation of gear 71 is such that when the fulcrum disc 46 reaches engine speed, i. e., when rollers 50 reach parallel positions, the rotation of the sun gear 71 will also have reached engine speed. In that position of the governing rollers, the rear clutch element 75 being engaged with the sun gear 71, the driven or propeller shaft 76 also rotates at engine speed, 1000 R. P. M. At this speed of the driven member it is synchronous with that of the engine or driving shaft 6, the rollers 50 being in their "full speed position" indicated in Fig. 1. Operating lever 165 is then in the position designated "full speed on transmission" on its guide segment 171. See Fig. 12.

The next step in the operation of the control mechanism is to move the operating lever 165 from the "full speed on transmission" position, in the direction of stop 172, which is the "full-speed-direct-coupled" position, in which the transmission of power is straight through from the engine to the driven shaft 76. As the lever 165 is moved in the direction of the stop 172, operating bar 115 moves in the direction of the arrow in Figs. 3 and 4, and rollers 122 and 123 of bar 115 traverse the curved portion of upper cam links 131 and 132, causing them to be disposed downwardly as shown in Fig. 4. In the initial part of this movement front and rear operating clutches 17 and 75 are disengaged from the fly-wheel 1 and sun gear 71, respectively, and in the latter part of the movement the rear clutch 75 is moved out of intermediate vertical position and is engaged through its radially depending tooth elements 83 with teeth 84 of clutch member 81 that is secured to rotate with shaft 6. In this position driven propeller shaft 76 is direct-connected to the engine through shaft 6 and fly-wheel 1, and is in its "full speed direct coupled" position. The speed of driven shaft 76 was synchronous with speed of shaft 6 immediately previous to that connection, and continues so.

By driving by direct connection of drive to driven member, or straight through the transmission, is meant the direct coupled drive just above described, in which the differential gear members mounted on or carried by quill shaft 8, gear 71 and governing discs, are all idle.

The reverse movement of the control lever, or when operating lever 165 is moved on its segment guide 171 in the opposite direction, towards the stop position in line with notch 174 of the guide bar 171, has an effect exactly the opposite of that in the direct operation. While passing through this arc of the segment 171, the lever operates bar 115 to move it toward the left whereby links 131 and 132 by virtue of engagement of rollers 122 and 123 therewith are disposed to effect angular movement of shafts 104 and 100 which operate the front and rear clutches 17 and 75 respectively to disengage in sequence the clutch element 75 from the clutch element 81 of the shaft 6. This step in the operation begins with the initial movement of operating lever 165 from point 172 on segment guide and is completed when the latter assumes the position on the segment guide 171 designated as the "full speed on the transmission". The front and rear clutches 17 and 75 now being in engagement with the fly-wheel 1 and sun pinion 71 respectively, and all members running at engine speed in synchronism with driven shaft 76, further movement of the operating lever will cause cam lever 146 to be subjected to angular movement by virtue of its engagement with roller 144 of the upper operating bar 115. The movement of cam lever 146 will be in the direction to adjust the rollers 50 to gradually bring them to the "stop" position indicated in Fig. 1 in which position fulcrum gear disc 46 will be speeded up and the sun gear 71 slowed down until the latter reaches zero speed. When the sun gear 71 and propeller shaft 76, which is engaged therewith stop rotating, the lever 165 registers with slot 174 and the lever 165 may be left in that position, or it may be depressed in its guide 175 to operate the bar 116 which displaces the cam links to disengage the front and rear clutch elements as shown in Fig. 2 if desired.

Figs. 1 and 4 illustrate the "full speed direct coupled" position of the transmission; Fig. 3 illustrates the stop position of the driven member or shaft 76 in which position the front and rear clutches are in engagement with the flywheel and sun gear respectively, and lever 165 is at stop position 174 on segment guide 171. Fig. 2 illustrates the stop position of the transmission in which the clutch elements are disconnected from all of the rotating elements and propeller shaft 76, this being the neutral, idle, or parking position of the transmission. This is the position in which with operating lever 165 depressed in guide bars 175 of segment guide 171, the engine may be operated without affecting the transmission, and driven or propeller shaft element of the vehicle. This condition is similar to that in Fig. 3 as mentioned in previous paragraph, except that the clutching members are disengaged.

For reverse operation of driven shaft 76, operating lever 165 is moved from "stop" position in the direction of stop 173 on the segment guide 171, toward the position designated as "reverse" in Fig. 14. This movement of the lever will actuate bar 115 in the reverse direction to its movement when the lever is moved in the direction of its full speed position, and this movement will move roller 144 to the extreme end of the curved portion 145 in cam lever 146, whereby the rollers 50 are moved to the position designated "reverse" in Fig. 1 of the drawings. In this position the speed of fulcrum disc 46 is increased beyond the speed at which sun gear 71 is stationary, and the latter will then necessarily rotate in a direction opposite to that of its rotation when rollers 50 were moved towards their full speed position. To bring the propeller or driven shaft 76 to a stop when operating in reverse, operating lever 165 is returned to notch 174 in the guide segment, which brings rollers 50 to the "stop" position.

It is evident from the foregoing description of this invention that transmission mechanism made in accordance therewith is effective in its operation to transmit a gradually variable speed to the driven shaft. Such a transmission mechanism is conducive to the attainment of maximum motor operating efficiency, since it permits an infinitely variable speed ratio between drive and driven shafts, between zero speed of the driven shaft and equal speed of the drive and driven shafts.

Some of the features of the transmission mechanism heretofore described are the ability of producing an infinite speed ratio variation without the shifting or clashing of gear elements; a minimum of gear operation due to the fact that the relative movement of gear teeth in the differential mechanism is small; such movements of the gear element as occur during adjustment of the normal speeds between the drive and driven shafts are of short duration, whereby the wear of the gear teeth is greatly reduced and the noise incident to the operation of gear wheels reduced to a minimum. It is to be particularly noted that the regulating rollers 50 and their cooperating discs 43 and 46 do not constitute a friction transmission but are governing or regulating elements which control the fulcrum gear of the differential gear mechanism to produce temporary variation in speed ratio between drive and driven shafts. In normal driving or direct coupled shaft condition, the rollers and discs are not in operation at all, speed being regulated by engine speed through throttle control. Difficulties inherent in the operation of continuous roller friction transmissions are not encountered in the present construction, the roller friction in the present invention being used as a speed control element only at such times as transmission is being operated for speed variation purposes.

Although the invention has been featured as embodied in a transmission mechanism for automobiles, it will be evident to those skilled in the art that the transmission per se may be applicable to a variety of uses where it is desirable or necessary to obtain uniformly variable speed transmissions. It is further evident that modifications may be made in the details of construction and in the arrangement of the several cooperating parts without departing from the principles herein set forth.

I claim:

1. A variable speed transmission comprising in combination a planetary differential gear mechanism, friction roller ratio-governing means therefor, means for operatively connecting said differential mechanism to a drive member and to a driven member, means for adjusting said ratio-governing means to produce directional and speed ratio variations of said driven member, and means for effecting a direct connection of the drive and driven members without actuation of the differential mechanism, said last named means being effective when said drive and driven members are operating at equal speed, and a single operating lever controlling all of said adjusting means.

2. A transmission mechanism comprising a primary drive shaft, a quill shaft mounted on the primary drive shaft and rotatable with respect thereto, a clutch for connecting and disconnecting said shafts, a driven shaft, opposed concave faced discs mounted on the quill shaft, the discs being adapted to rotate about the quill shaft, friction rollers connecting the said discs, means to vary the angularity of the friction rollers whereby to vary the ratio of rotation of the discs, the first disc being positively connected to rotate with the quill shaft, a differential gear train mounted on the quill shaft and connected to the second disc, a clutch connecting the differential gear train to the driven shaft, and means to connect the primary drive shaft direct to the driven shaft thereby by-passing the quill shaft and the members mounted thereon.

3. A transmission mechanism comprising a primary drive shaft, a secondary co-axial quill drive shaft mounted on the primary drive shaft, a clutch for connecting and disconnecting said shafts, a driven shaft, a differential gear train mounted on the quill shaft and positively driven by the drive shaft, governing means mounted on the quill shaft whereby to vary the transmission ratio of said differential, a releasable clutch connecting the differential gear train to the driven shaft, and means to connect the primary drive shaft direct to the driven shaft thereby by-passing the quill shaft and the members mounted threon.

4. A transmission mechanism comprising a primary drive shaft, a secondary quill drive shaft mounted on the primary drive shaft, a clutch for connecting and disconnecting said shafts, a driven shaft, a planetary differential gear train mounted on the quill shaft and positively connected to the drive shaft, a clutch connecting the differential gear train to the driven shaft, rotation ratio governing means associated with said differential comprising an orbit gear and means operatively connected to the drive shaft to hold the orbit gear, said holding means comprising gear wheels which are adapted to react on the drive shaft in the direction of driving thereof, and means to connect the primary drive shaft direct to the driven shaft without involving the quill shaft and the members mounted thereon.

5. A transmission device comprising a drive shaft, a driven shaft, a concave-faced disc member mounted to rotate about the axis of the drive shaft in the direction opposite to the direction of rotation of said shaft and which is positively connected by gear wheels to the drive shaft, a second oppositely disposed coaxial concave-faced disk member mounted for rotation independent of said drive shaft, friction rollers mounted between in contact with and adapted to transmit rotative movement in opposite directions between said discs, means to vary the angularity of said rollers relative to said discs, and a planetary differential gear device connecting the second disc, the drive shaft and the driven shaft, whereby to translate rotation of the drive shaft to rotation of the driven shaft at various speed ratios determined by the angular position of the rollers betwen the discs.

6. A transmission device comprising a drive shaft, a driven shaft, a concave-faced disc member mounted to rotate with the drive shaft gear wheels connecting said disk and drive shaft in a direction opposite to the direction of rotation of said drive shaft, a second oppositely disposed concave-faced disk member mounted for rotation independent of said drive shaft, friction rollers mounted between in contact with and adapted to transmit rotative movement in opposite directions between said discs, means to vary the angularity of said rollers relative to said discs, a planetary differential gear train connecting the second disc, the drive shaft and the driven shaft, the planetary members of said differential being driven in revolutionary movement by the drive shaft, whereby to translate rotation of the drive shaft to rotation of the driven shaft at various speed ratios determined by the angular position of the rollers between the discs.

7. A transmission device comprising a drive shaft, a driven shaft, a concave-faced disc member mounted on the drive shaft, gear wheels connecting said disk and drive shaft, a second oppositely-disposed concave-faced rotatably-mounted disc member, friction rollers mounted between in contact with and adapted to transmit rotative movement between said discs, means to vary the angularity of said rollers relative to said discs, a planetary differential gear device connecting the second disc, the drive shaft and the driven shaft whereby to translate rotation of the drive shaft to rotation of the driven shaft at various speed ratios determined by the angular position of the rollers between the discs, and clutch mechanism connecting the differential gear train to the driven shaft.

8. A transmission device comprising a drive shaft, a driven shaft, a concave-faced disc member mounted and positively connected by gear wheels to rotate with the drive shaft, a second oppositely disposed concave-faced rotatably mounted disc member, friction rollers mounted between in contact with and adapted to transmit rotative movement between said discs, means to vary the angularity of said rollers relative to said discs, a planetary gear train connecting the second disc, the drive shaft and the driven shaft whereby to translate rotation of the drive shaft to rotation of the driven shaft at various ratios determined by the angular position of the rollers between the disc, said train comprising an orbit gear carried by the second disc, a planetary gear revolved by the drive shaft, and a sun gear driven by the planetary member, and clutch mechanism for connecting the sun gear to the driven shaft.

9. A transmission device comprising a drive shaft, a driven shaft, a disc member mounted coaxially with the drive shaft, gear wheels connecting said disk and drive shaft, a second disc member rotatably mounted coaxially on the drive shaft, said disc members having opposed concave faces, frictional rollers positioned between the discs and adapted to contact therewith, means to simultaneously vary the angularity of said rollers whereby to vary in opposite directions the respective distances of the contacts of the rollers from the axes of the two discs, an orbit gear carried by the second disc, planetary gears carried by said drive shaft and engaging the teeth of the orbit gear, and a sun gear engaged by the planetary gears, and mechanism for connecting said sun gear and driven shaft, whereby the direction and speed of rotation of the latter are controlled by said orbit gear.

10. A transmission device comprising a drive shaft, a driven shaft, a disc member mounted coaxially with the drive shaft, gear wheels connecting said disk and drive shaft, a second disc member rotatably mounted coaxially on the drive shaft, said disc members having opposed concave faces, frictional rollers positioned between the discs and adapted to contact therewith, means to simultaneously vary the angularity of said rollers whereby to vary in opposite directions the respective distances of the contacts of the rollers from the axes of the two discs, an orbit gear carried by the second disc, planetary gears engaging the teeth of the orbit gear and revolved by direct connection to the drive shaft, a sun gear engaged by the planetary gears, and mechanism for connecting said sun gear and driven shaft, whereby the direction and speed of rotation of the latter are controlled by said orbit gear.

11. A transmission device comprising a quill drive shaft, a driven shaft, a disc member mounted coaxially on said drive shaft and connected by gear wheels to rotate therewith, a second disc member mounted coaxially on said drive shaft and adapted for rotation independent of said shaft, said disc members having opposed concave faces, gear wheels connecting said discs, a friction roller positioned between the discs and adapted to contact therewith, means to vary the angularity of said roller with respect to the discs whereby to change the respective distances of the contacts of the roller from the axes of the two discs, an orbit gear carried by the second disc, planetary gears engaging the teeth of the orbit gear, a sun gear engaged by the planetary gears and adapted to be connected to the driven shaft, and a spider rotatably carrying the planetary gears, said spider being mounted to rotate with the quill drive shaft.

12. A transmission device comprising a quill drive shaft, a driven shaft, a disc member mounted coaxially on said drive shaft and connected by gear wheels to rotate therewith, a second disc member mounted coaxially on said drive shaft and adapted for rotation independent of said shaft, said disc members having opposed concave faces, gear wheels connecting said discs, friction rollers positioned between the discs and adapted to contact therewith, means to simultanously vary the angularity of said rollers with respect to the discs whereby to vary the respective distances of the contacts of the roller from the axes of the two discs, an orbit gear carried by the second disc, planetary gears engaging the teeth of the orbit gear, a sun gear engaged by the planetary gears and adapted to be connected to the driven shaft, a spider rotatably carrying the planetary gears said spider being mounted to rotate with the quill drive shaft, and means actuated by resistance to rotation of the drive shaft to force and hold the discs against said intermediate rollers.

13. A transmission device comprising a quill drive shaft, a driven shaft, a disc member mounted coaxially on said drive shaft and connected by gear wheels to rotate therewith, a second disc member mounted coaxially on said drive shaft to be rotatable with respect thereto, said disc members having opposed concave faces, gear wheel connecting said discs, a frictional contact roller positioned between the discs and adapted to contact therewith, means to vary the angularity of said roller whereby to vary the respective distances of the contacts of the roller from the axes of the two discs, an orbit gear carried by the second disc, planetary gears engaging the teeth of the orbit gear, a sun gear engaged by the planetary gears, a clutch adapted to connect the sun gear to the driven shaft, a spider rotatably carrying the planetary gears, said spider being mounted to rotate with the quill drive shaft, and means actuated by resistance to rotation of the drive shaft to force and hold the discs against said intermediate rollers.

14. A power transmission device comprising a primary driving shaft, a secondary coaxial quill driving shaft, and a driven shaft, a clutch between the primary and secondary driving shafts, a driving disc having a concave face mounted on said secondary shaft and connected to be rotatable therewith, a second concave-faced disc rotatably mounted upon and with respect to the quill shaft, a friction roller positioned between and in contact with the concave faces of the said discs, means to vary the angularity of the roller with respect to the concave faces of the discs whereby to vary the ratio of rotation thereof, means to constantly urge the two discs together upon the intermediate rollers, an orbit gear carried by the second disc, a planetary gear engaging said orbit gear, a sun gear engaged by said planetary gear and adapted to be connected to said driven shaft, and a spider upon the quill driving shaft carrying and adapted to revolve the planetary gear.

15. A power transmission device comprising a prime mover driving shaft, a coaxial quill shaft mounted on the driving shaft and adapted to be rotated therewith, a clutch between the driving and quill shafts, a driven shaft, a concave-faced disc mounted upon and adapted to be rotated by the quill shaft, a second concave-faced disc mounted upon the quill shaft but independently rotatable with respect thereto, friction rollers positioned between and in contact with the concave faces of the said discs, means to vary the angularity of the rollers with respect to the concave faces of the discs whereby to govern the ratio of rotation thereof, means actuated by resistance of the quill shaft, to force and hold the two discs together upon the intermediate rollers when the transmission is operating, a gear rotatable with the first-mentioned disc, an orbit gear carried by the second disc, planetary gears engaging said orbit gear, a sun gear engaged by said planetary gears and adapted to be connected to said driven shaft, a spider attached to the quill shaft rotatably carrying the planetary gears and adapted to revolve them about its axis, a gear rotatable with the said spider, and a miter gear connecting the gear rotatable with the first disc and the gear rotatable with the spider.

16. A power transmission device comprising a primary driving shaft, a quill shaft constituting a secondary driving shaft and adapted to rotate therewith, a driven shaft, a clutch between the primary and secondary driving shafts, a concave-faced disc mounted upon the quill shaft, a second concave-faced disc mounted upon the quill shaft but independently rotatable with respect thereto, friction rollers positioned between and in contact with the concave faces of the said discs, means to vary the angularity of the rollers with respect to the concave faces of the discs whereby to govern the ratio of rotation thereof, means to force and hold the two discs together upon the intermediate rollers when the transmission is operating, a gear rotatable with the first-mentioned disc, an orbit gear carried by the second disc, planetary gears engaging said orbit gear, a sun gear engaged by said planetary gears, and adapted to be connected to said driven shaft, a spider upon the quill shaft rotatably carrying and adapted to revolve the planetary gears, and means connecting the quill shaft to the first disc and adapted to rotate said disc at the same speed as said shaft but in opposite directions.

17. A power transmission device comprising a primary driving shaft, a quill shaft constituting a secondary driving shaft and adapted to rotate therewith, a driven shaft, a clutch between the primary and secondary driving shafts, a concave-faced disc mounted upon the quill shaft, a second concave-faced disc mounted upon the quill shaft but independently rotatable with respect thereto, friction rollers positioned between and in contact with the concave faces of the said discs, means to vary the angularity of the rollers with respect to the concave faces of the discs whereby to govern the ratio of rotation thereof, means to force and hold the two discs together upon the intermediate rollers when the transmission is operating, a gear rotatable with the first-mentioned disc, an orbit gear carried by the second disc, planetary gears engaging said orbit gear, a sun gear engaged by said planetary gears and adapted to be connected to said driven shaft, a spider upon the quill shaft rotatably carrying and adapted to revolve the planetary gears, means connecting the quill shaft to the first disc and adapted to rotate said disc at the same speed as said shaft but in opposite directions, and a clutch for connecting the sun gear to a shaft to be driven, and a clutch adapted to disconnect the sun gear from the driven shaft and to connect the drive shaft direct to the driven shaft.

18. In a transmission device comprising a driving and a driven member, opposed concave-faced discs slidably mounted by carriages on the driving member, angularly adjustable contact rollers between the discs, one disc being positively connected to the driving member, a differential planetary gear train connecting the other of said discs to the driven member, means for securing and maintaining effective contact of the discs on the rollers comprising a collar member slidably mounted coaxially with the driving member, said collar member having an inclined face, an envelope sleeve member for said collar, an interior lug projecting from the envelope member into the space formed between the inclinde face of the collar members and an opopssed abutment on the driving member, the envelope member being adapted to be rotated with respect to the driving member, and said abutment being connected with the carriage of one of said discs and the collar being connected to the carriage of the other of said discs, whereby separation of the collar from the abutment members forces the discs a corresponding distance towards each other.

19. In a transmission device, a pair of coaxially disposed concave-faced discs rotatably and slidably mounted by carriages with adjustable contact rollers therebetween, means for securing and maintaining effective contact of the discs on the rollers comprising a thrust member slidably mounted on the driving shaft and abutting the carriage of the first disc, said thrust member having an inclined face, an envelope member for said thrust member, an interior wedge projecting from the envelope member and adapted to contact with the inclined face of the thrust member, an abutment member on the side of the wedge opposite the thrust member and connected to the second disc, the envelope member being adapted to drive the driving member, whereby relative movement of said lug on the inclined collar forces the discs towards each other.

20. A variable speed transmission comprising in combination a drive shaft adapted to be coupled to a prime mover, a quill shaft journalled to be independently rotatable on said drive shaft, a variable speed differential gear mechanism mounted coaxially with said drive and quill shafts the planetary system of which being adapted for rotation with the latter, a front clutch member mounted for movement on one end of said quill shaft and adapted for engagement with said prime-mover, a clutch element provided on the rear end of said drive shaft, a driven shaft in coaxial alignment with said drive shaft, a clutch member mounted on the end of the driven shaft adjacent the rear end of the drive shaft and adapted for engagement with the clutch element of the latter, means for simultaneously operating said front and rear clutches to respectively engage the prime mover and a clutch element provided in one of the gear wheels of the differential mechanism, means for governing said differential gear mechanism to produce speed-ratio variations of said driven shaft, and means operative when the speed of the latter is synchronous with the speed of the drive shaft for simultaneously operating said clutches to break their clutching engagements and to engage the rear clutch of the drive member with the clutch element of said driven shaft.

21. A variable speed transmission comprising in combination a primary drive shaft adapted to be coupled to a prime mover, a quill shaft journalled to be independently rotatable on said drive shaft, a variable speed differential gear mechanism having a clutch element mounted coaxially with said drive and quill shafts the planetary system of which being adapted for rotation with the latter, a front clutch member mounted for movement on one end of said quill shaft and adapted for engagement with said prime-mover, a clutch element provided on the rear end of said drive shaft, a driven shaft in coaxial alignment with said drive shaft, a clutch member mounted on the end of the driven shaft adjacent the rear end of the drive shaft and adapted for engagement with the clutch element of the latter, means for simultaneously operating said front and rear clutches to respectively engage the prime mover and the clutch element of the differential mechanism, means for governing said differential gear mechanism to produce speed ratio variations of said driven shaft, said means comprising a friction roller element connected by gear wheels to react on the quill shaft, and means operative when the speed of the latter is synchronous with the speed of the drive shaft for simultaneously operating said clutches to break their clutching engagements and to engage the rear clutch element of the drive member with the clutch of said driven shaft, said clutch operating and differential regulating means being operated by a single control lever.

22. A variable speed transmission comprising a drive member and a driven member, an auxiliary drive member adapted to be coupled to said first named drive member, a differential mechanism carried by said auxiliary member, clutch mechanism for effecting a direct connection between the primary drive and driven members in one position, and for effecting a connection between the auxiliary member and the driven member through a differential mechanism when the direct connection is broken between the primary drive and the driven members.

23. A variable speed transmission comprising a primary drive and a driven member, an auxiliary drive member adapted to be coupled to said primary drive member, a differential mechanism carried by said auxiliary member, and a clutch adapted in its neutral position to disengage the driven member from both of said drive members and which is adapted to effect a direct couple of the primary drive and the driven members in one operative position, and a connection between the auxiliary drive and driven members through said differential mechanism in the other of its operative positions.

24. A variable speed transmission comprising a primary drive and a driven member, an auxiliary drive member journalled for rotation independent of said primary drive and driven members, said auxiliary drive member being adapted for direct coupling with the primary drive member, a planetary transmission mechanism mounted on said auxiliary member, the planet carrier of which is adapted to rotate therewith, a roller friction regulating device controlling the fulcrum gear of said differential mechanism which is journalled to rotate with said auxiliary drive member, and a pressure regulating device for said roller friction members which is responsive to the reaction of the fulcrum member of the differential mechanism to render said roller friction device operative.

25. A variable speed transmission comprising a primary drive and a driven member, an auxiliary drive member comprising a quill shaft rotatably journalled on the primary drive member, a clutch mechanism for engaging said auxiliary shaft and primary drive member and a clutch mechanism for effecting a direct couple of the primary drive and driven members, a differential mechanism carried by said quill shaft and adapted to be coupled to the driven member by the second named clutch mechanism, and roller friction governing mechanism for said differential mechanism, said governing mechanism comprising a friction disk which is rotatable with the fulcrum gear of said differential mechanism, a second friction disk in axially spaced relation with said first named disk, gear wheels connecting said second named disk with the auxiliary drive shaft to produce rotation of the disk in a direction opposite to the direction of rotation of said auxiliary shaft, and rollers disposed between said disks and adapted to be adjusted to vary the relative speeds of said disks.

26. A variable speed transmission comprising a primary drive and a driven member, an auxiliary drive member comprising a quill shaft rotatably journalled on the primary drive member, a clutch mechanism for engaging said auxiliary shaft and primary drive member, and a clutch mechanism for effecting a direct couple of the primary drive and driven members, a differential mechanism carried by said quill shaft and adapted to be coupled to the driven member by the second named clutch mechanism, and roller friction governing mechanism for said differential mechanism, said governing mechanism comprising a friction disk which is rotatable with the fulcrum gear of said differential mechanism, a second friction disk in axially spaced relation with said first named disk, gear wheels connecting said second named disk with the auxiliary drive shaft to produce rotation of the disk in a direction opposite to the direction of rotation of said auxiliary shaft, rollers disposed between said disks and adapted to be adjusted to vary the relative speeds of said disks and means responsive to the reaction of the fulcrum gear of the differential mechanism for producing radial pressure on said roller friction members.

27. A variable speed transmission comprising a primary drive and a driven member, an auxiliary drive member journalled to rotate independently of said primary drive member, means for effecting a direct couple of the primary and auxiliary drive members, differential mechanism carried by said auxiliary drive member, regulating means for said differential connected to be actuated by said auxiliary member, clutch mechanism which in its neutral position disconnects the drive and the driven members, and in one of its operative positions directly couples the primary drive and driven members, and in its other operative position connects the driven member to the auxiliary drive member through the differential mechanism, said last named clutch mechanism being cooperatively connected to the coupling means for the auxiliary and primary drive members so that the latter will be disconnected when the clutch mechanism connecting the driven member is in the position in which the primary drive and the driven members are directly coupled.

28. Apparatus as set forth in the preceding claim in which the clutch mechanism connecting the driven members is in its neutral or disconnected position at the instant the clutch mechanism for coupling the auxiliary and primary drive members is brought to its clutch making engagement with the primary drive member.

In testimony whereof, I sign my name.
GEORGE SMITH MORISON.